UNITED STATES PATENT OFFICE.

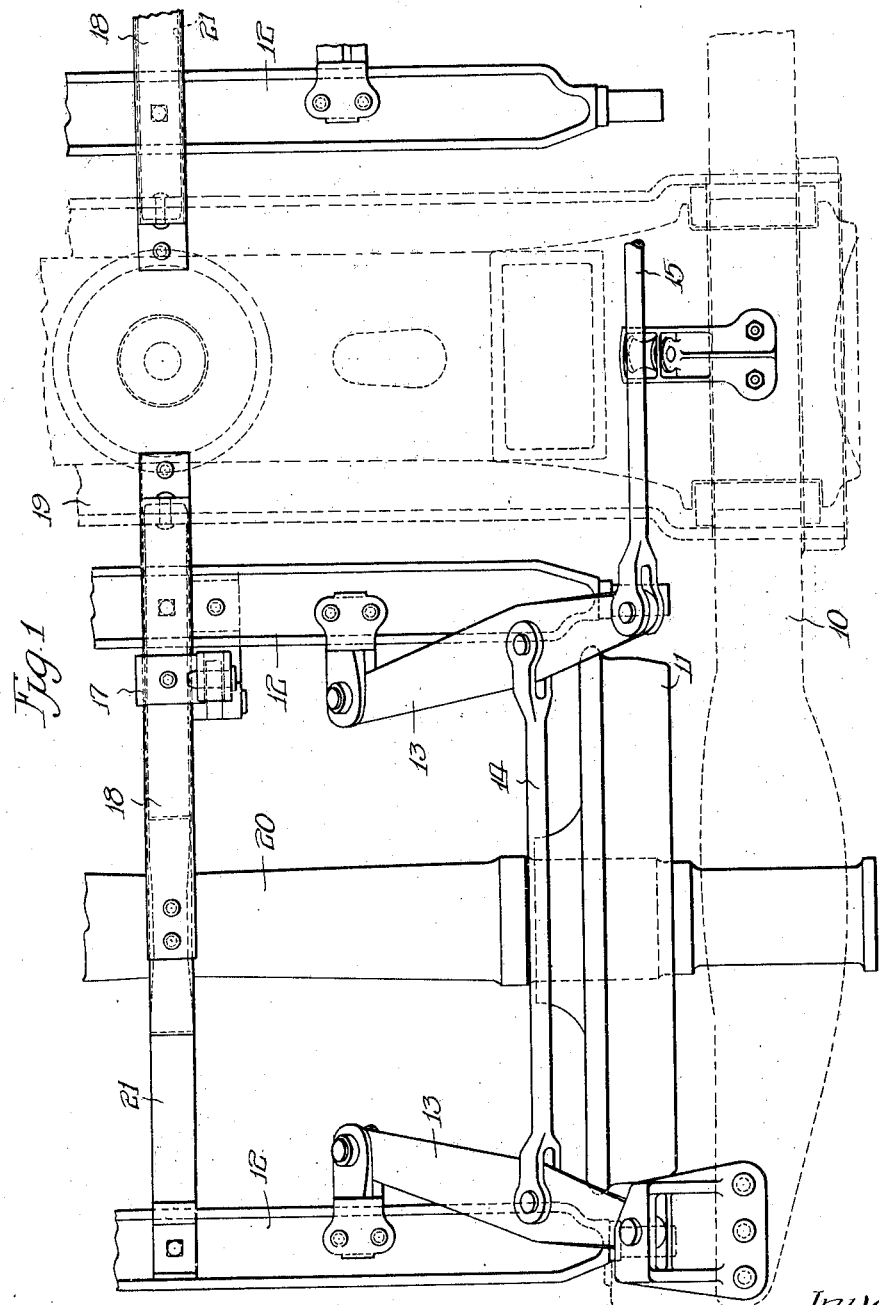

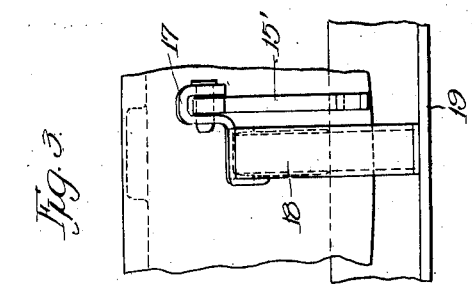
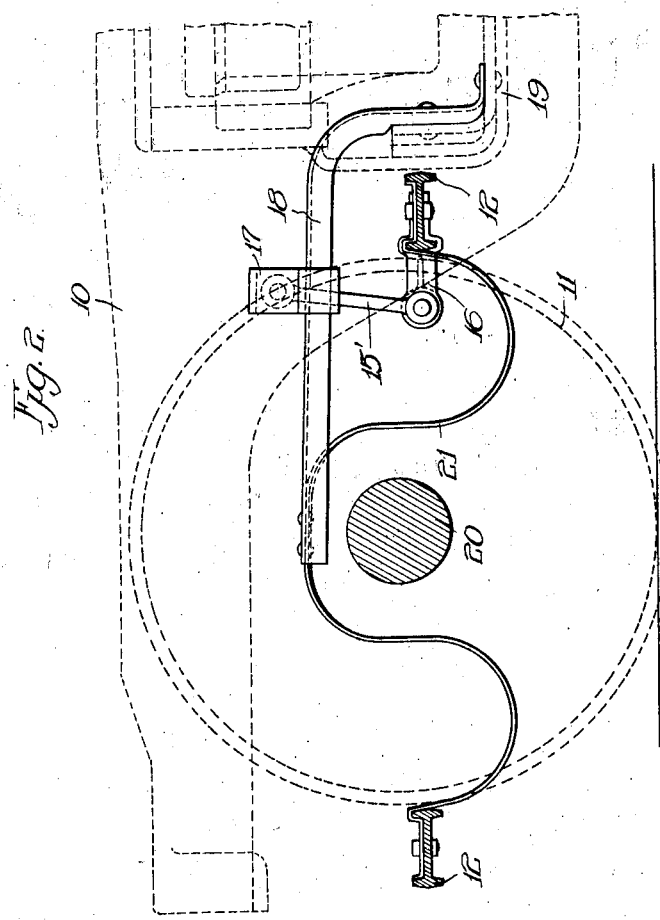

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

BRAKE ARRANGEMENT.

1,335,189.

Specification of Letters Patent. Patented Mar. 30, 1920.

Application filed May 23, 1919. Serial No. 299,234.

*To all whom it may concern:*

Be it known that I, ARMAND H. PEYCKE, a citizen of the United States, residing at Chicago, in the county of Cook and State of Illinois, have invented certain new and useful Improvements in Brake Arrangements, of which the following is a specification.

This invention relates to brake arrangements.

The objects of this invention are to simplify and improve brake arrangements, and more particularly means for supporting brake beams, and to provide a brake arrangement adapted to meet the requirements for successful commercial operation.

These and other objects are accomplished by means of the arrangement disclosed on the accompanying sheets of drawings, in which—

Figure 1 is a fragmentary view of a railway car truck embodying my invention;

Fig. 2 is a fragmentary side elevation of the same; and

Fig. 3 is a detail end elevation showing the third-point support connected to the release spring supporting means.

Referring to the figures of the drawings, it will be noted that I have shown a railway car truck including a frame 10, carried by wheels 11, upon opposite sides of which are brake beams 12. Connected to these brake beams are brake levers 13, which are connected by tension members 14 and 15, whereby braking movements are transmitted to the brake beams for moving the brake heads (not shown) into engagement with the braking surfaces of the wheels 11.

These brake beams are supported by the usual hangers at each end of the beam, said hangers being connected either to the beam at or near the brake heads or secured to the brake heads in the usual manner.

In addition to the regular hangers for supporting the brake beams at the ends thereof, I have provided a third-point support, which includes a hanger 15′ pivotally connected to a fulcrum 16 connected to the middle portion of the associated brake beam 12. This hanger is connected to a bracket 17, which is mounted upon release spring supporting means 18, which supporting means 18 takes the form of a member secured to the truck spring plank 19 about the middle thereof, said member extending longitudinally of the truck and overhanging the wheel axle 20 and one of the brake beams 12. Secured to the end of this release spring supporting member 18 is a double release spring 21, which extends in opposite directions and is secured to the associated brake beams for giving same a releasing action.

The third-point supporting bracket 17 is connected to the release spring supporting means 18 intermediate the ends of the latter and substantially in the middle thereof. This release spring supporting means 18 forms a convenient means for supporting the third-point supporting bracket, thereby obviating the necessity of using a special bracket formed on the truck frame. This supporting member 18 therefore not only supports the brake release spring, but also acts as a support for the brake beam third-point supporting member.

It is my intention to cover all modifications of the invention falling within the spirit and scope of the following claims.

I claim—

1. In brake mechanism, a truck having a spring plank, release spring carrying means secured to said spring plank, a brake beam lying under said means, and a third-point support for said brake beam hung from and carried by said release spring supporting means.

2. In brake mechanism, brake beams mounted on each side of a pair of wheels, a supporting member overhanging one of said beams and terminating intermediate said beams, a double release spring supported by said supporting member and being connected to said brake beams for giving the latter a releasing movement, and a third-point support for one of said brake beams carried by said release spring supporting means.

Signed at Chicago, Illinois, this 20th day of May, 1919.

ARMAND H. PEYCKE.